United States Patent Office 3,007,907
Patented Nov. 7, 1961

3,007,907
POLYMERIZATION PROCESS, USING A CATALYST OF AN ALKALI METAL HYDROCARBON, A GROUP IVB METAL TETRAHALIDE AND ALUMINUM TRICHLORIDE
Robert E. Robinson and Stuart Schott, Cincinnati, Ohio, assignors to National Distillers and Chemical Corporation, New York, N.Y., a corporation of Virginia
No Drawing. Filed Dec. 30, 1955, Ser. No. 556,468
10 Claims. (Cl. 260—94.9)

This invention relates generally to a novel olefin polymerization process and to novel combination polymerization catalysts useful therefor. More particularly, the invention realtes to polymerization of olefins such as ethylene at atmospheric or relatively low pressures and at relatively low temperatures in the presence of novel and critical catalyst combinations.

It has now been discovered that it is possible to prepare high density, high molecular weight, high melting, linear polyethylene polymers with good impact strength and other outstanding physical properties by the herein described novel process using novel catalyst combinations. This process for polymerization of ethylene to high polymers is carried out at atmospheric or relatively low pressures while operating at temperatures ranging from −20° C. to 200° C.

In accordance with this invention, the polymerization is carried out with a catalyst which is a combination of (1) an organic alkali metal derivative of a hydrocarbon, that is, an alkali metal hydrocarbon, such as organosodium, organopotassium, or organolithium compounds, or the like, with (2) a tetrahalide of a metal from group IVb of the periodic table, the group consisting of titanium, zirconium, hafnium, and thorium, or a compound in which from 1 to 4, inclusive, of the halide atoms of the above-described metal tetrahalides is replaced with an OR group in which R is an alkyl radical and (3) aluminum trichloride.

The proportional amounts of the components of the combination catalyst may be varied over rather wide ranges depending particularly on the results desired as to characteristics of the polymer product, reaction rate, and the like. For most purposes, however, suitable results are obtained by practice of the invention by the use of a combination catalyst as embodied herein wherein the ratio (by weight) of the alkali metal compound to the titanium or zirconium compound and aluminum trichloride is within the range of one part of the alkali metal compound to about 0.05 to 5 parts of the group IVb metal compound to about 0.1 to 3 parts of aluminum trichloride. As to the total amount of catalyst utilized for the polymerization reaction, the amount employed may be varied from about 0.01 to about 15% or more by weight based on the weight of ethylene reactant. In preferred embodiment, however, the catalyst is used in amounts of from about 0.1 to about 1.0% by weight of the ethylene employed. These polymerization catalyst combinations are novel and the results obtained are unexpected and entirely unpredictable under the relatively mild conditions employed. Whereas neither of the catalyst components used alone will react with ethylene under the pressure and temperature conditions of the process embodied herein, immediate and rapid polymerization occurs when ethylene is contacted with one of the appropriate herein described combination catalysts preferably suspended in a hydrocarbon medium even though the suspension is maintained substantially at atmospheric pressure and room temperature.

Thus, the series of new combination catalysts which has been discovered for the conversion of ethylene to high molecular weight polymers comprise alkali metal compounds, illustrative of which are alkali metal-alkyls, -cycloalkyls, or -aryls in combination with titanium halides, such as titanium tetrachloride, titanium tetrabromide, and the like, or the tetraalkyl titanates, or the corresponding zirconium compounds, and aluminum trichloride. Reaction conditions involve contact of ethylene under relatively mild conditions with a solution or suspension of combination catalysts in inert hydrocarbons, for example, such as heptane or mineral spirits. By use of such catalyst systems ethylene polymers can be produced having molecular weights of up to about 3,000,000 and more. When reference is made herein to molecular weight, there is meant the molecular weight measurements as determined by intrinsic viscosity measurements. Accordingly, polyethylene polymers ranging in molecular weight up to 3,000,000 and higher can be made with appropriate combinations of the herein described catalysts and under suitably selected conditions.

In carrying out this invention, polymerization is effected by contacting ethylene with the appropriate combination catalyst. One essential component consists of an alkali metal organic compound which can be an alkyl, cycloalkyl or aryl compound. The other component is at least one metallic compound of the metals from group IVb, preferably titanium or zirconium tetrachloride, tetrabromide, or the alkyl or aryl titanates or zirconates. The alkali metal hydrocarbon component can be, for instance, methylsodium, ethylsodium, vinylsodium, allylsodium, butenylsodium, n-propylsodium, isopropylsodium, n-butylsodium, isobutylsodium, amylsodium, n-hexylsodium, n-octadecylsodium, n-butyllithium, isobutyllithium, amyllithium, octylsodium, dodecylsodium, phenylsodium, phenyllithium, naphthylsodium, napthyllithium, benzylsodium, diphenylmethylsodium, disodiooctadiene, disodiodiphenylbutane, cyclopentadienylsodium, methylcyclopentadienylsodium, and the like.

Tetraalkyl titanates and tetraalkyl zirconates which are useful include methyl, ethyl, isopropyl, n-propyl, butyl, amyl derivatives, and the like, and illustrative of which are tetra-n-butyl titanate, tetra-2-ethylhexyl titanate, tetra-2-ethylbutyl titanate, and tetra-stearyl titanate. Mixed compounds such as butoxy titanium trichloride, ethoxy titanium trichloride, dibutoxy titanium dichloride, dibutoxy zirconium dichloride, triethoxy zirconium bromide, ethoxy butoxy titanium dichloride, ethoxy dibutoxy titanium chloride, and the like can also be used.

The temperature used can vary from −20° C. or below and up to 200° C. or even higher although, generally, these higher temperatures lower the yield probably in part by shortening the catalyst life. Thus, it is best to employ temperatures as low as possible which are compatible with good conversion and high product quality. Temperatures in the range of 130–140° C. are most desirable for continuous operations, otherwise the polymer products may become substantially insoluble.

The pressures used can be substantially atmospheric, although moderate superatmospheric pressures while unnecessary are also operable, for instance, 5 to 50 atmospheres. This is in marked contrast to known processes for production of polyethylene which employ superatmospheric pressures of 500–1000 atmospheres and upward.

The polymerization reaction is carried out either in batch, semi-continuous, or continuous operations. It is especially well suited to continuous operations. Most conveniently, and in the preferred embodiments, the process is carried out in a diluent or liquid reaction medium, the amount not being unduly critical, but it should be at least sufficient to permit effective agitation and, preferably, to hold the major portion of the polymer product in solution. Organic solvents and/or diluents of the organic hydrocarbon class such as petroleum ether, pentane, cyclopentane, the hexanes, cyclohexanes, heptane, mineral spirits, petroleum hydrocarbons, benzene, xylenes, toluene, and mixtures of these materials can be used. It is preferred that the material used be free of impurities which may react to destroy catalyst activity or which copolymerize with ethylene, that is materials such as water, alcohols, ethers, and unsaturates should be preferably absent. Thus, the diluent should essentially consist of one or more inert saturated hydrocarbons, that is, hydrocarbons devoid of olefinic unsaturation.

For this improved process, pure ethylene may be used or there may be used, equally well, a gas mixture containing major quantities of ethylene, provided no impurities are present which will destroy the catalyst and/or contaminate the polymer products. For instance, ethylene obtained by the cracking of hydrocarbon streams is satisfactory if acetylenic materials are not present.

In carrying out the herein described polymerization process, it is preferably and highly desirable to maintain the polymerization zone free of extraneous reactive gases. This can be done by keeping the reactor blanketed at all times with an inert gas, for instance, operating with an inert gas such as nitrogen or such inert gases as argon and helium. Preferably, and especially during continuous operations, the reactor and its contents are blanketed with ethylene gas to avoid unnecessary dilution of the reactor contents with inert gases.

In contacting the ethylene with the catalyst combinations, one suitable method is to prepare a dispersion or solution of the alkali metal alkyl, cycloakyl, or aryl in the diluent selected for use. This can be done by initially dispersing the alkali metal, for instance, sodium, in the reaction medium and adding thereto the appropriate alkyl, cycloalkyl, or aryl derivatives, such as an appropriate halide. The resulting solution or dispersion of alkali metal compound is then treated with the other catalyst components such as titanium or zirconium tetrachloride and aluminum trichloride. Ethylene or ethylene containing feed is passed into the resulting mixture, or it may be present in solution before final addition of the $TiCl_4$ or $ZrCl_4$. Absorption of ethylene starts immediately upon addition of either ethylene to the combination catalyst or addition of $TiCl_4$ or $ZrCl_4$ for instance, to the alkali metal alkyl, cycloalkyl, or aryl containing dissolved ethylene in solution. Absorption is generally accompanied by a rise in temperature. When absorption has ceased or slowed down considerably, ethylene flow is stopped. The crude polymer is isolated by filtration or evaporation of the reaction mixture followed by washing to remove catalyst, and drying. If it is substantially insoluble, it can be separated directly, suitably washed and dried.

In the following description of polymer products obtained by practice of this invention, molecular weight and softening point determinations were made by the following procedure:

*Molecular weight.*—Molecular weight was determined from the intrinsic viscosity of the polyethylene samples in tetralin at 105° C. The equation relating intrinsic viscosity and molecular weight is:

$$(n) = 1.35 \times 10^{-4} M^{0.63}$$

This relationship was developed by Harris* who measured viscosities at 75° in xylene. These polymers cannot be handled under these conditions because of their limited solubilities. In theory however, the intrinsic viscosity is independent of solvent and temperature.

*Softening points.*—Because of the high molecular weight and relatively broad melting range of the majority of the polyethylenes obtained, true melting points cannot be directly determined. Thus, the initial softening points were recorded. The softening point was determined by placing the specimen on a melting block and slowly increasing the temperature while constantly working the sample with a small spatula. The softening point was taken at the temperature at which a variety of properties such as general appearance, degree of granulation, cohesiveness, and gumminess underwent change at the greatest rate. All of the determinations were made by the same operator who was able to reproduce values on successive days within about 3° C. In general, the softening points on polyethylene samples obtained through the use of these catalysts ranged from 130° to 140° C.

The polymeric products which are obtained are readily and conveniently handled, and can be processed and treated in accordance with regularly accepted practices to produce, for example, elastic and flexible sheets, films and the like. The products also can be extended by suitable extrusion means or molded by injection molding. They can also be used in fiber-forming operations to obtain ribbons, filaments, and threads having high strength and great elasticity. The polymers can be spun into fibers and filaments using the methods and techniques generally applicable to nylon type materials.

The examples below are presented solely as representative embodiments of the invention, and it is intended in no way to limit the scope of the invention thereto. All parts are by weight unless otherwise specified.

EXAMPLE 1

Run No. 1

Under an atmosphere of dry, oxygen-free nitrogen, a dry glass, resin kettle was charged with 50 volumes of dry mineral spirits and 6.0 parts of a 40% sodium dispersion in mineral spirits (particle size of dispersed sodium=2–3 microns). n-Butyl chloride (2.78 parts) was then added in small increments, with stirring, the temperature being maintained between 30–40° C. When all of the n-butyl chloride was added, the material was stirred an additional 20 minutes. Anhydrous aluminum chloride (1.6 parts) and additional mineral spirits (350 volumes) was then added and the resulting mixture stirred for 15 minutes. Ethylene was then passed into the solution at a rate of one part per minute. When complete saturation of the reaction medium was effected, 1.7 parts of titanium tetrachloride was added. A dark brown color developed immediately and absorption of ethylene began. The temperature gradually rose to a maximum of 72° C. after 28 minutes, and then began to taper off. When the reaction was stopped after 75 minutes, the temperature was 55° C. The reaction mixture was filtered, and the solid polymer washed several times with water. After drying under vacuum at 85° C., 41.3 parts of white solid polyethylene was obtained with a softening point of 140° C.

Run No. 2

For comparison purposes, the aforesaid process was carried out in the absence of aluminum trichloride with the result that a yield of only 8.5 parts of a polymer of similar properties was obtained.

---

* I. Harris, J. Poly. Sci. 8, 353 (1952).

EXAMPLE 2

Numerous additional studies were made for polymerization of ethylene in the manner described in Example 1 with different proportional amounts of catalyst components and total catalyst concentration, and the results of such runs are set forth in the following tabulation which includes, for comparison purposes, corresponding runs with and without use of aluminum trichloride in the catalyst.

| Run No. | Butyl-sodium (mole) | AlCl$_3$ (mole) | TiCl$_4$ (mole) | Reaction Time (minutes) | Polymer Product (parts) |
|---|---|---|---|---|---|
| 3 | 0.03 | -------- | 0.03 | 46 | 5.3 |
| 4 | 0.03 | 0.012 | 0.04 | 75 | 28.2 |
| 5 | 0.03 | -------- | 0.007 | 69 | 14.8 |
| 6 | 0.03 | 0.012 | 0.007 | 75 | 45.4 |
| 7 | 0.06 | -------- | 0.03 | 75 | 50.0 |
| 8 | 0.06 | 0.020 | 0.03 | 60 | 63.0 |

In all of the runs for which data is set forth, super polymeric material of comparable characteristics was obtained, including apparent molecular weights of three million or greater. Of considerable importance, however, is that in each case wherein aluminum chloride was a component of the combination catalyst, the yields of the super polymer were markedly in excess of the yields obtained from corresponding or comparable runs but in the absence of aluminum chloride. Thus, in a process as embodied herein, the use of aluminum chloride in the defined combination catalyst serves, in unexpected manner, to result in production of increased yields of the super polyethylene without substantial, if any, effect in molecular weight. Hence, and particularly from the viewpoint of production of such super polymers in increased yield without substantial effect in molecular weight, the process embodied herein is an improvement over the process described in a patent application Ser. No. 554,426, filed December 21, 1955 by Stuart Schott and John F. Nobis, and entitled "Polymerization" which relates to a process for polymerization of ethylene with a cocatalyst of an alkali metal hydrocarbon and a group IV$b$ metal compound as aforedescribed.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. A polymerization process which comprises contacting ethylene with a combination catalyst consisting essentially of the reaction mixture formed in admixing (1) at least one alkali metal hydrocarbon, (2) at least one compound from the group consisting of group IV$b$ metal tetrahalides and compounds in which from 1 to 4, inclusive, of the halide atoms of a group IV$b$ metal tetrahalide is replaced with an OR group in which R is alkyl, and (3) aluminum trichloride in an amount sufficient to increase the activity of components (1) and (2) so as to increase polymer yield.

2. Process described in claim 1 in which the polymerization is effected in the presence of an inert hydrocarbon diluent.

3. Process described in claim 1 in which the polymerization is effected at a pressure below 50 atmospheres.

4. A process, as defined in claim 1, wherein the ethylene is contacted with from about 0.01 to about 15%, based on the weight of the ethylene, of the combination catalyst.

5. A process, as defined in claim 1, wherein the combination catalyst is formed by admixing the components of (1), (2) and (3) in an inert diluent.

6. Process described in claim 1 in which the combination catalyst contains in weight ratio one part of the alkali metal hydrocarbon to 0.05 to 5 parts of the group IV$b$ metal compound and 0.1 to 3 parts of aluminum trichloride.

7. Process described in claim 6 in which the polymerization is effected in the presence of an inert hydrocarbon diluent.

8. Process described in claim 6 in which the polymerization is effected at a pressure below 50 atmospheres.

9. Polymerization process which comprises contacting ethylene, in the presence of an inert hydrocarbon diluent, at a pressure below 50 atmospheres and at a temperature in the range of −20° C. to 200° C. with a combination catalyst consisting essentially of the reaction mixture formed in admixing (1) at least one alkali metal hydrocarbon, (2) at least one compound selected from the group consisting of group IV$b$ metal tetrahalides and compounds in which from 1 to 4 inclusive of the halide atoms of a group IV$b$ metal tetrahalide is replaced with an OR group in which R is an alkyl radical, and (3) aluminum trichloride, said catalyst being used in an amount of 0.01 to 15% by weight of total catalyst based on the ethylene reactant, and said catalyst being characterized by comprising by weight one part of the alkali metal hydrocarbon to 0.05 to 5 parts of the group IV$b$ metal compound and 0.1 to 3 parts of aluminum trichloride sufficient to increase the activity of components (1) and (2) so as to increase polymer yield.

10. A polymerization process which comprises contacting ethylene with a combination catalyst consisting essentially of the reaction mixture formed in admixing (1) an alkali metal hydrocarbon (2) a group IV$b$ metal tetrahalide and (3) aluminum trichloride in an amount sufficient to increase the activity of components (1) and (2) so as to increase polymer yield.

References Cited in the file of this patent

UNITED STATES PATENTS

| | | |
|---|---|---|
| 1,914,557 | Craver | June 20, 1933 |
| 2,388,178 | Peterson | Oct. 30, 1945 |
| 2,396,920 | Larson | Mar. 19, 1946 |
| 2,439,765 | Walker | Apr. 13, 1948 |
| 2,699,457 | Ziegler | Jan. 11, 1955 |
| 2,721,189 | Anderson | Oct. 18, 1955 |

FOREIGN PATENTS

| | | |
|---|---|---|
| 874,215 | Germany | Apr. 20, 1953 |
| 534,792 | Belgium | Jan. 31, 1955 |

OTHER REFERENCES

Ziegler et al.: Annalen B. D. 589 (1954), pages 91–121, page 94 only relied on.